G. V. HALE.
SHAFT COUPLING.
APPLICATION FILED APR. 6, 1918.
1,278,459.
Patented Sept. 10, 1918.
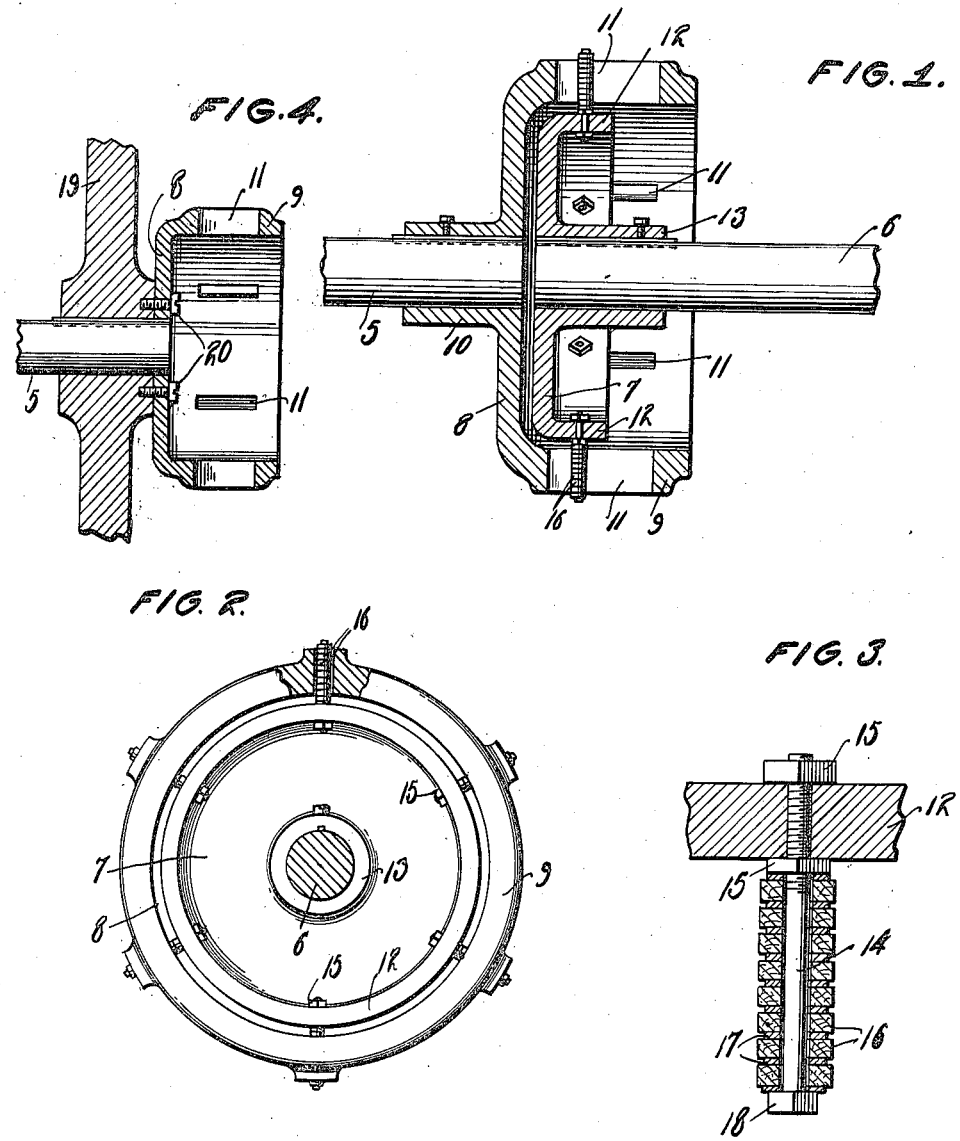
WITNESSES
INVENTOR
Guy V. Hale
BY
ATTORNEY

UNITED STATES PATENT OFFICE.

GUY V. HALE, OF SARATOGA SPRINGS, NEW YORK.

SHAFT-COUPLING.

1,278,459.

Specification of Letters Patent.  Patented Sept. 10, 1918.

Application filed April 6, 1918. Serial No. 227,059.

*To all whom it may concern:*

Be it known that I, GUY V. HALE, a citizen of the United States, residing at Saratoga Springs, in the county of Saratoga and State of New York, have invented certain new and useful Improvements in Shaft-Couplings, of which the following is a specification.

This invention relates to shaft couplings, aiming for its primary object to provide a simplified and improved means for effecting a positive driving connection between adjacent shaft ends, which will be strong and durable and which will permit of the shafts being disposed at angles to each other, and which is constructed and arranged in such manner as to minimize the opportunity for wear.

A further object of the invention is to provide an improved shaft coupling which is capable of being quickly and easily assembled upon the shaft ends, which is constructed in such manner as to be capable of being manufactured at low cost, which requires little or no attention after once being assembled, which requires no lubrication, and which will prove thoroughly practical and efficient in use.

With these objects in view, together with others which will appear as the description proceeds, the invention resides in the novel formation, combination, and arrangement of parts, all as will be described more fully hereinafter, illustrated in the drawings, and particularly pointed out in the claims.

In the drawings:—

Figure 1 is a sectional view taken through a shaft coupling constructed in accordance with the invention, Fig. 2 is an end view, parts broken away, of the improved coupling, Fig. 3 is an enlarged fragmentary view showing the manner in which the connecting studs or pins are assembled upon the coupling head, and Fig. 4 is a slightly modified form of socket member used in carrying out the invention.

Referring now more particularly to the drawings, 5 and 6 indicate adjacent shaft ends with which the improved coupling is adapted to be used.

The coupling includes a head member indicated at 7 and a socket member indicated at 8, the latter comprising a disk having a forwardly extending flange 9 at its outer edge disposed at substantially right angles to the forward face of the disk. This disk is provided with a central boss 10 adapted to fit over the shaft end 5, and the boss may be coupled to the shaft by a key and set screw as shown. It will be observed that the flange is thickened at regular intervals around its periphery, and these thickened portions are cut away to provide elongated slots 11 disposed parallel to the shaft 5.

The head 7 comprises a disk of smaller diameter than the socket member 8, and the said disk is provided with an inwardly extending right angularly disposed flange 12 at its outer edge. The disk 7 may also be provided with an inwardly projecting boss 13 adapted to snugly fit upon the shaft end 6, and a key and set screw may be employed for holding the boss and head rigidly upon the said shaft end. The flange 12 of the head is equipped with a plurality of outwardly extending studs or pins 14 which engage loosely in the elongated slots 11 in the flange of the socket member.

The pins 14 are threaded at one end into the flange 12, and lock nuts 15 assist in holding the pins firmly to the said flange. Each pin is provided with a buffer comprising a plurality of fiber disks 16 arranged in spaced relation throughout the length of the outer portion of the pins. These buffer disks are held apart by washers 17, the said washers being of smaller diameter than the said fiber members. A head 18 is arranged upon the outer extremity of each of the pins 14 and holds the buffer members and metallic washers firmly in proper position upon the pin. While I have stated that the buffer members are formed of fiber, it will be understood that the invention is not necessarily limited thereto, as raw hide, rubber or other compressible and resilient material may equally as well be used.

In Fig. 4 of the drawings there is illustrated the slight modification of the invention, wherein the socket member of the improved shaft coupling is applied to a shaft equipped with a fly wheel. In this form of the invention, the fly wheel upon the shaft 5 is indicated at 19, and the disk of the socket member 8 may be provided with openings therein to receive tie bolts 20, these bolts being threaded into the outer face of the fly wheel. In this form of the invention the boss for assisting in securing the socket member to the shaft is dispensed with.

From the foregoing it is obvious that I have provided a shaft coupling which is of extremely simple and inexpensive construction and which may be readily applied to or removed from the shaft ends. The coupling is so arranged as to permit the shaft moving toward or away from each other, and also permits the shafts being disposed at angles to one another. The operation of the device, as well as the manner in which it may be applied to or removed from the shaft ends, is obvious.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In combination, head and socket members, the said socket member having slots therein, pins projecting from said head and extending into said slots, and compressible members on said pins in spaced relation.

2. In combination, head and socket members, the said socket member having slots therein, pins projecting from said head and extending into said slots, metallic and fiber rings on said pins in alternate relation, and the said fiber rings being of greater diameter than the said metallic rings.

3. A coupling comprising head and socket members, the said socket member having slots therein, the said head fitted loosely within said socket, pins arranged in spaced relation on said head and extending radially therefrom through said slots, and compressible rings on each of said pins.

In testimony whereof I affix my signature in presence of two witnesses.

GUY V. HALE.

Witnesses.
   WILL W. SMITH,
   CORLISS SHELDON.